United States Patent [19]

Coué

[11] Patent Number: 4,534,238

[45] Date of Patent: Aug. 13, 1985

[54] LEVER AND COLLAR UNIT IN PARTICULAR FOR A CYCLE

[75] Inventor: Maurice E. L. Coué, Feucherolles, France

[73] Assignee: Huret et ses Fils, Nanterre, France

[21] Appl. No.: 452,710

[22] Filed: Dec. 23, 1982

[30] Foreign Application Priority Data

Dec. 30, 1981 [FR] France ............... 81 24503

[51] Int. Cl.³ .................. F16C 1/10; G05G 11/00
[52] U.S. Cl. .................. 74/489; 74/501 R; 74/526; 24/31 F; 24/270
[58] Field of Search .......... 74/501 R, 523, 548, 74/526, 489, 487; 24/270, 31 F; 403/353

[56] References Cited

U.S. PATENT DOCUMENTS

| | | | |
|---|---|---|---|
| 3,059,906 | 10/1962 | Powell et al. | 74/501 R |
| 3,924,487 | 12/1975 | Huret et al. | 74/501 R |
| 4,156,371 | 5/1979 | Juy | 74/501 R |
| 4,222,286 | 9/1980 | Huret | 74/501 R |

FOREIGN PATENT DOCUMENTS

| | | | |
|---|---|---|---|
| 456851 | 9/1928 | Fed. Rep. of Germany | 24/270 |
| 272560 | 3/1951 | Switzerland | 24/31 F |

*Primary Examiner*—Kenneth J. Dorner
*Attorney, Agent, or Firm*—Trexler, Bushnell & Wolters, Ltd.

[57] ABSTRACT

The unit comprises a collar defining a bearing surface (13) for the lever, a fixing device such as a rivet (24) which also constitutes the journal on which the lever (25) is mounted, and an elastically yieldable washer (23). The collar defines also a cavity (16) for a member constituting an abutment for a cable sheath and may be provided with a rapid fixing device.

16 Claims, 10 Drawing Figures

LEVER AND COLLAR UNIT IN PARTICULAR FOR A CYCLE

DESCRIPTION

The present invention relates to levers for actuating derailleurs or the like employed in particular on cycles.

In the known devices, these levers are mounted on collars which are themselves fixed to the frame of the cycle. The collar carries at least one welded member which defines a bearing surface for the lever and a journal about which this lever can turn. The unit further comprises a washer or plate defining a thrust member for the lever and capable of constituting a sheath abutment, two friction washers, two elastically yieldable washers and tightening means screwed in the journal. There is consequently an high number of component parts in this unit and this complicates manufacture, increases the assembly time and the overall cost of the unit. It might also be mentioned that the collars are usually fixed to the cycle by screw-and-nut assemblies so that, as they are delivered assembled, they must be disassembled before being placed in position, which also constitutes a loss of time.

An object of the invention is to provide a lever unit which overcomes these various drawbacks and is simple in construction and particularly easy to assemble.

The invention therefore provides a lever unit, in particular for a cycle, comprising a collar carrying at least one radially extending journal, at least one bearing surface which is substantially perpendicular to the axis of the journal, and a lever mounted on the journal and against the bearing surface, wherein the collar comprises, in one piece with the collar, at least one radially projecting portion which defines on the outer surface thereof a bearing surface for the lever and on the inner surface thereof a cavity capable of receiving a member constituting a sheath abutment.

According to other features of the invention:
said projecting portion defines at least one abutment limiting the travel of the lever;
the journal on which the lever is mounted also forms the fixing means for the latter;
the journal is in one piece with the collar;
the journal is formed by a rivet;
an elastically yieldable washer is provided between the bearing surface defined by the collar and the adjustment surface of the lever;
the lever comprises at least one cavity in which the actuating cable can be elastically clipped and retained;
the collar is provided with rapid fixing means instead of the conventional nut-and-screw arrangements.

The invention will be described in more detail hereinafter with reference to the accompanying drawing which is given solely by way of example and in which.

Figure 2:
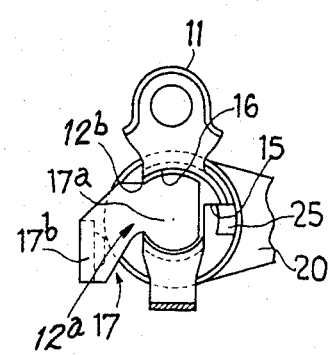
FIG. 2 is a sectional view taken on line 2—2 of FIG. 1.
Figure 1:
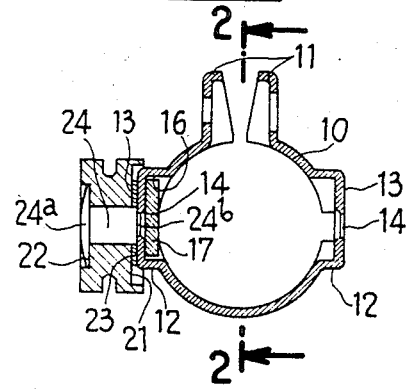
FIG. 1 is a sectional view of a collar and lever unit according to the invention.

The drawing, and in particular FIGS. 1 and 2, shows a lever unit, for example a lever for actuating a derailleur for a cycle, comprising a collar 10 on which is mounted the lever proper 20. The collar is shaped in such manner as to define, on one hand, fixing tabs 11 which may be, for example, associated with conventional screw-and-nut means and, on the other hand, two projecting portions 12 which are disposed at rougly 90° relative to the fixing tabs and diametrically opposed to the latter. Each of these two projecting portions extends roughly radially relative to the axis of the collar and defines, on an outer side of the projecting portion, a bearing surface 13 which is roughly planar and extends outwardly and perpendicularly to the diameter of the collar. This bearing surface is provided with an orifice 14 centered on the same diameter of the collar.

As can be seen in FIG. 2, the projecting portion includes a step 15 which constitutes an abutment limiting the angular travel of the lever. This projeting portion further defines, on the inner side thereof facing the axis of the collar, a cavity 16 in which may be received an L-shaped member 17 having one branch 17a shaped in such manner as to be capable of being received in the cavity 16 and another branch 17b shaped so as to act as a sheath abutment and allow the actuating cable to pass therethrough, this branch 17b extending out of the cavity 16 through a lateral opening 12a which is provided in the projecting portion and defines an abutment edge 12b positioning the branch 17b.

Also according to the invention, the lever 20 is mounted in a very simple manner. This lever, which is for example made from a plastics or other material, comprises on each of its sides a counterbore 21, 22, the counterbore 21 facing the collar preferably receiving a washer 23 of elastically yieldable material, for example of polyurethane, interposed between the end of the counterbore and the bearing surface of the collar. This washer has for example a thickness of 4 mm in the free state and is compressed to a thickness of about 2 mm upon assembly. Means for securing the lever comprise a rivet 24 whose head 24a faces outwardly and is received in the counterbore 22 of the lever and whose body portion 24b is riveted behind the rear or inner side of the projecting portion 12. The latter is so shaped that the end of the rivet does not project into the cavity 16 and does not hinder the insertion of the member 17 constituting a sheath abutment.

Figure 4:
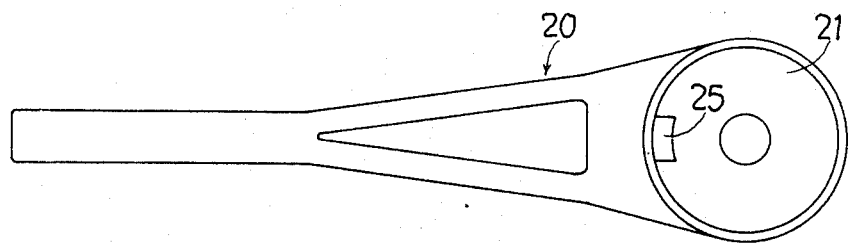
FIGS. 4 and 5 are two side elevational views of the same lever.
Figure 3:
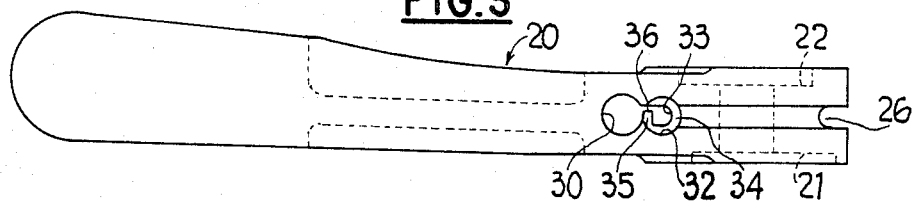
FIG. 3 is an elevational view to an enlarged scale of the lever.

The lever proper will now be described in more detail with reference to FIGS. 3 to 5. This lever comprises, on the side thereof facing the collar, a plug 25 adapted to cooperate with the abutment 15 of the collar so as to limit its angular travel. It includes a groove 26 for the passage of the cable and a cavity of original shape allowing the mounting of the head of the cable 27 which is constituted in the conventional manner by a small metal member 28 of substantially cylindrical shape fixed on the end of the cable. The cavity formed in the lever includes a first roughly cylindrical portion 30 whose axis is orthogonal to the axis of the journal and whose diameter is slightly greater than the diameter of the head of the cable. This first cylindrical portion extends throughout the lever and opens roughly tangentially onto a second stepped cavity 31 which includes, on one hand, a cylindrical portion 32 whose diameter is slightly greater than the diameter of the head of the cable, and a coaxial passage 33 whose diameter is greater than the diameter of the cable, but less than that of said head. A transverse shoulder 34 is therfore provided at the junction of the portion 32 and the passage 33. Further, the partition portion 35 between the two cavities 30 and 31 includes a lateral passage 36 which extends also throughout the thickness of the lever and has in at least a part of its length a width less than the diameter of the cable which acts as retaining means for the cable in the cavity 31.

Figure 5:
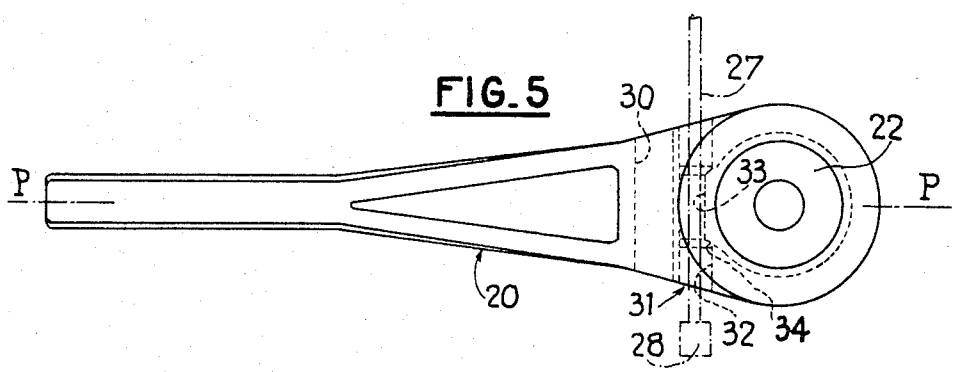

Preferably, this part of the lever is constructed rougly symmetrical with respect to a plane such as the plane P shown in FIG. 5, so that two identical cavities 32 are provided for the cable which may therefore be mounted on one side or the other of the lever.

The arrangement just described affords the following advantage:

The number of parts forming the unit including the lever and the collar is very small since the bearing surface for the lever is integral with the collar and the journal on which the lever is rotatable constitutes at the same time means for fixing the lever. The only additional member is here formed by the single elastically yieldable washer 23. The member 17 constituting a sheath abutment may be placed in position very easily and no welding operation is required for constructing this collar and this unit.

The construction of the lever proper is also very advantageous, since it is unecessary to mount the cable in the factory when manufacturing the lever and this cable can therefore be mounted by the user very simply by engaging its end in the cylindrical cavity 30 and then exerting a sufficient force in the direction of the second cavity 31 to cause the cable to pass through the partition wall 35, after which the cable is maintained in position and can no longer leave the cavity.

Figure 6:
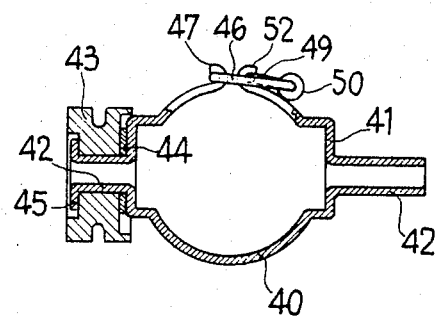
FIG. 6 is a sectional view similar to FIG. 1 of a modification.

FIG. 6 shows a modification in which the collar 40 is constructed in such manner as to define a lateral projecting portion constituting not only a bearing surface 41 but also a hollow journal 42 on which the lever 43 is mounted. In this arrangement, there is provided a lever identical to that described before and an additional yieldable washer 44. The lever is here secured in position by riveting over the end 45 of the journal.

Figure 7:
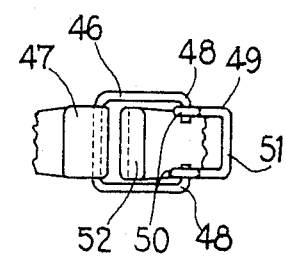
FIG. 7 is a view of the details of the fixing of the collar.

The fixing of the collar is also modified. It is here achieved by rapid fixing means comprising two metal wire members, the first member 46 having a roughly U-shaped whose web portion is received in a formed-over end portion 47 of one of the branches of the collar and whose free end portions of the branches are folded over inwardly at 48 so as to act as a pivot pin for a second member 49 which also has a U-shape whose end portions are folded over at 50 so as to form articulation eyes on the journals 48, the web 51 of the member 49 being adapted to engage in a formed-over end portion 52 of the other branch of the collar. In the open position (FIG. 7), the second member is completely spced away from the end portion 52 of the branch of the collar. In the closed position, the web 51 of this second member is disposed in this formed-over end portion 52 and locks the collar by a toggle action between the first member 46 and the second member 49 as they are urged toward the collar.

This manner of mounting the collar is advantageous, since it avoids the use of nuts and screws which must be screwed together when manufacturing the collar and then unscrewed by the user and once again screwed together after assembly. Loss of these screws and nuts, which is frequent during transport, is also avoided.

Figure 8:
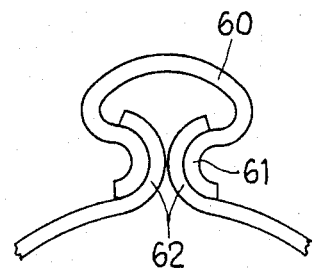
FIGS. 8 and 9 are views of fixing means for this collar.

The modification shown in FIG. 8 concerns another member for fixing the collar and constituted by a spring steel section member 60 which has rougly the shape of an omega and which is so arranged as to engge by its two branches 61 on the two formed-over end portions 62 of a collar similar to that of FIG. 6.

Figure 10:
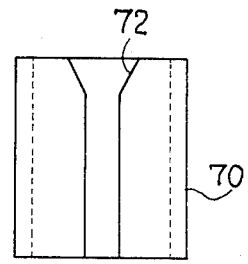
FIG. 10 is a side elevational view of the fixing means of FIG. 9.
Figure 9:
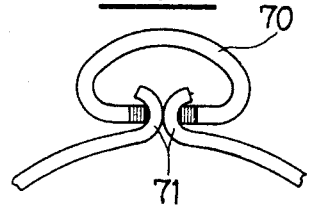

The modification shown in FIGS. 9 and 10 concerns another fixing means for the collar also formed by a spring steel section member 70 which is engaged on the two formed-over end portions 71 of the branches of the collar. As can be seen in FIG. 10, and as can aso be provided in the embodiment shown in FIG. 8, the member 70 includes an enlarged entrance region 72 for facilitating the positioning of the collar.

Having now described my invention what I claim as new and desire to secure by Letters Patent is:

1. A collar and lever unit comprising a collar which has an axis and comprises, in one integral piece with the collar, at least one hollow portion which projects from the collar and has an axis extending substantially radially from said axis of the collar and defines, on an outer side of the projecting portion, a bearing surface for the lever, said bearing surface extending transversely of said axis of the projecting portion, said projecting portion further defining, on an inner side of the projecting portion, a cavity, an abutment member disposed in said cavity and forming an abutment for a sheath of a cable for combining with the unit, said projecting portion further defining a lateral opening having an abutment edge and through which opening said abutment member extends while being positioned against said abutment edge, and a journal carried by said projecting portion and extending from said outer side of said projecting portion, said lever being mounted on said journal to be rotatable about an axis of rotation.

2. A unit according to claim 1, wherein said projecting portion defines at least an abutment cooperative with a complementary abutment of the lever for limiting the angular travel of the lever about said journal.

3. A unit according to claim 1, wherein the journal on which the lever is mounted also constitutes means for securing the lever in position.

4. A unit according to claim 3, wherein the journal is in one piece with the collar.

5. A unit according to claim 3, wherein the journal is formed by a rivet having an enlarged end portion behind said projecting portion.

6. A unit according to claim 1, comprising a single washer composed of an elastically yieldable material interposed between a bearing surface on the lever and said bearing surface of the projecting portion.

7. A unit according to claim 1, comprising means for securing the lever in position on the journal, a single washer composed of an elastically yieldable material interposed between a bearing surface of the lever and said bearing surface of the projecting portion.

8. A unit according to claim 1, wherein the lever comprises at least one cavity in which the cable may be engaged elastically in opposition to retaining means.

9. A unit according to claim 8, wherein the cable has a head, the lever defines a first cylindrical cavity extending throughout the lever and in which cavity the head of the cable is capable of freely passing, and a second cavity extending in a direction parallel to the first cavity and communicating with the first cavity laterally through a passage whose width is less than the diameter of the cable, said second cavity being stepped and comprising a portion having a diameter exceeding the diameter of the head of the cable and a portion having a diameter intermediate between the diameter of the cable and the diameter of the head of the cable.

10. A unit according to claim 8, wherein the cavity in the lever is substantially symmetrical relative to a plane of the lever containing the axis of rotation of the lever whereby the cable may be mounted on one side or the other of said plane of the lever.

11. A unit according to claim 9, wherein each cavity in the lever is substantially symmetrical relative to a plane of the lever containing the axis of rotation of the lever whereby the cable may be mounted on one side or the other of said plane of the lever containing said axis of rotation.

12. A unit according to claim 1, wherein the collar is in a single C-shaped piece and has two branches provide with rapid fixing means combined with said branches for fixing said two branches together.

13. A unit according to claim 12, wherein said rapid fixing means comprise two formed-over end portions of said branches of the collar, two U-shaped members having branches and a web interconnecting the branches of each U-shaped member, said U-shaped members being pivoted together at ends of the branches of the U-shaped members and respectively engaging by said webs in said two formed-over end portions of the branches of the collar, said two U-shaped members having a toggle action for urging said two end portions toward each other.

14. A unit according to claim 12, wherein said fixing means comprise two formed-over end portions of the branches of the collar, and a fastener having such sectional shape as to engage on the two formed-over end portions of the branches of the collar.

15. A unit according to claim 14, wherein said sectional shape is a C-shape.

16. A unit according to claim 14, wherein said sectional shape is an $\Omega$-shape.

* * * * *